United States Patent
Bert

(10) Patent No.: US 11,684,210 B2
(45) Date of Patent: Jun. 27, 2023

(54) OVEN INCLUDING GAS BURNER AND WOOD TRAY

(71) Applicant: Eric Thomas Bert, Woodbury, MN (US)

(72) Inventor: Eric Thomas Bert, Woodbury, MN (US)

(73) Assignee: Napoli LLC, Woodbury, MN (US)

( * ) Notice: Subject to any disclaimer, the term of this patent is extended or adjusted under 35 U.S.C. 154(b) by 854 days.

(21) Appl. No.: 16/556,274

(22) Filed: Aug. 30, 2019

(65) Prior Publication Data

US 2020/0345176 A1 Nov. 5, 2020

Related U.S. Application Data

(60) Provisional application No. 62/842,997, filed on May 3, 2019.

(51) Int. Cl.
| | |
|---|---|
| *F24B 13/02* | (2006.01) |
| *A47J 37/06* | (2006.01) |
| *F24B 15/00* | (2006.01) |
| *A23L 5/10* | (2016.01) |

(52) U.S. Cl.
CPC .......... *A47J 37/0658* (2013.01); *A23L 5/15* (2016.08); *A47J 37/0647* (2013.01); *A47J 37/0664* (2013.01); *F24B 13/02* (2013.01); *F24B 15/005* (2013.01); *A23V 2002/00* (2013.01)

(58) Field of Classification Search
CPC ............... A47J 37/0658; A47J 37/0647; A47J 37/0664; A23L 5/15; F24B 13/02; F24B 15/005; A23V 2002/00
USPC .......................................... 99/324; 126/25 R
See application file for complete search history.

(56) References Cited

U.S. PATENT DOCUMENTS

| | | | | |
|---|---|---|---|---|
| 3,295,509 A * | 1/1967 | Harvey | ................ | F24B 15/005 126/41 R |
| 5,195,423 A * | 3/1993 | Beller | ................ | A47J 37/0704 99/450 |
| 5,878,739 A * | 3/1999 | Guidry | ................ | A47J 37/0786 126/41 R |
| 6,289,795 B1 * | 9/2001 | McLemore | ......... | A47J 37/0786 126/41 R |
| 9,182,129 B2 * | 11/2015 | Dahle | ................ | A47J 37/0727 |
| 2003/0217647 A1 * | 11/2003 | Jones | ..................... | G06Q 10/10 99/450 |

(Continued)

FOREIGN PATENT DOCUMENTS

GB 2528854 A 2/2014

OTHER PUBLICATIONS

U.S. Appl. No. 62/608,185, filed Dec. 20, 2017.

(Continued)

*Primary Examiner* — Avinash A Savani
(74) *Attorney, Agent, or Firm* — Merchant & Gould P.C.

(57) ABSTRACT

An example oven can include: a main body with a cooking cavity; a front portion of the main body having a front opening for receiving a pizza and acting as an air vent; a wood burning tray assembly including a grate positioned in the main body; and a gas burner positioned adjacent to the wood burning tray assembly; wherein the gas burner is configured to combust a gas to heat the cooking cavity; and wherein the gas burner is positioned to ignite wood on the grate of the wood burning tray assembly to further heat the cooking cavity.

12 Claims, 18 Drawing Sheets

(56) References Cited

U.S. PATENT DOCUMENTS

| | | | |
|---|---|---|---|
| 2010/0132689 A1* | 6/2010 | Contarino, Jr. | A47J 37/0786 126/25 B |
| 2015/0157173 A1* | 6/2015 | Jepsen | A47J 37/0745 126/25 AA |
| 2017/0020337 A1* | 1/2017 | Borovicka | A47J 37/0786 |
| 2018/0213973 A1 | 8/2018 | Tapaninaho | |
| 2019/0049117 A1 | 2/2019 | Tapaninaho | |

OTHER PUBLICATIONS

Kickstarter, Napoli Multi-Fueled Outdoor Pizza Oven, Nov. 7, 2017, 33 pages.
Gozney, Roccbox Portable Wood and Gas Pizza Oven, copyright 2019.

* cited by examiner

OVEN INCLUDING GAS BURNER AND WOOD TRAY

RELATED APPLICATIONS

This patent application is related to U.S. Patent Application No. 62/608,185 filed on Dec. 20, 2017 and U.S. Patent Application No. 62/842,997 filed on May 3, 2019, the entireties of which are hereby incorporated by reference.

INTRODUCTION

The quest to cook the perfect Neapolitan style pizza with a light, crispy crust is a never-ending journey. Restaurants construct large, wood-filled brick ovens that are maintained at the high temperatures necessary to cook these pizzas. However, it is difficult and cost-prohibitive for individuals to create the proper cooking environment at home or on the go. This can result less-then-optimal conditions that cause the pizza to be over- or under-cooked.

SUMMARY

In one aspect, an example oven can include: a main body with a cooking cavity; a front portion of the main body having a front opening for receiving a pizza and acting as an air vent; a wood burning tray assembly including a grate positioned in the main body; and a gas burner positioned adjacent to the wood burning tray assembly; wherein the gas burner is configured to combust a gas to heat the cooking cavity; and wherein the gas burner is positioned to ignite wood on the grate of the wood burning tray assembly to further heat the cooking cavity.

Other configurations are possible.

DETAILED DESCRIPTION

In examples provided herein, an oven is provided to cook various food items. In these examples, the oven can be generally rectangular and used to cook a pizza, such a Neapolitan style pizza.

The oven can use a variety of fuel types, including gas (propane), natural gas, wood, charcoal, and/or wood pellets, to heat up to 900+ degrees Fahrenheit in a short amount. One example of an oven that can use a variety of fuel types (e.g., wood and gas) is provided in U.S. Patent Application No. 62/608,185 filed on Dec. 20, 2017.

In the examples provided herein, the oven allows one to use multiple fuel sources to cook. In one example, this includes using both gas and wood fuel sources at the same time. Generally, a gas burner provides a quick, reliable source of heat. The gas burner, in turn, is used to ignite and burn wood placed in the oven adjacent to the gas burner.

In the provided examples, the gas burner slides into the specially designed wood tray, allowing one to put wood on top of the gas burner. This allows the gas burner to quickly heat the oven and maintain a consistent temperature. Then, one can add wood to the oven, which is ignited by the gas burner. The wood provides that natural, smoky wood flavor in the pizza. The embodiments provided herein maintain the burning of the wood because the gas burner is provided adjacent to (below) the wood.

Additional details for the example oven are provided in the accompanying drawings, which are hereby incorporated by reference in their entirety.

Figure 1:
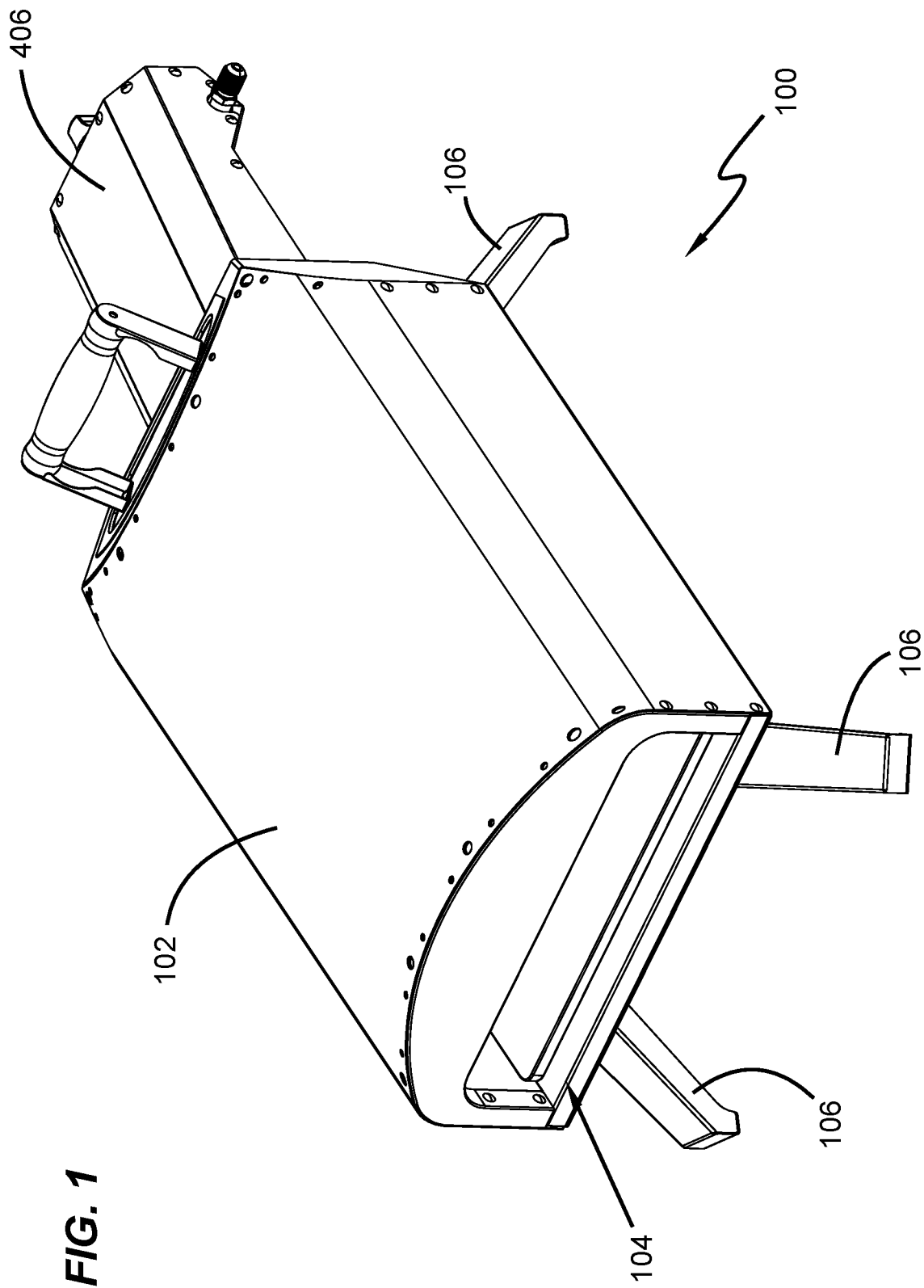
FIG. 1 shows an example oven configured to use multiple fuel sources.
Figure 2:
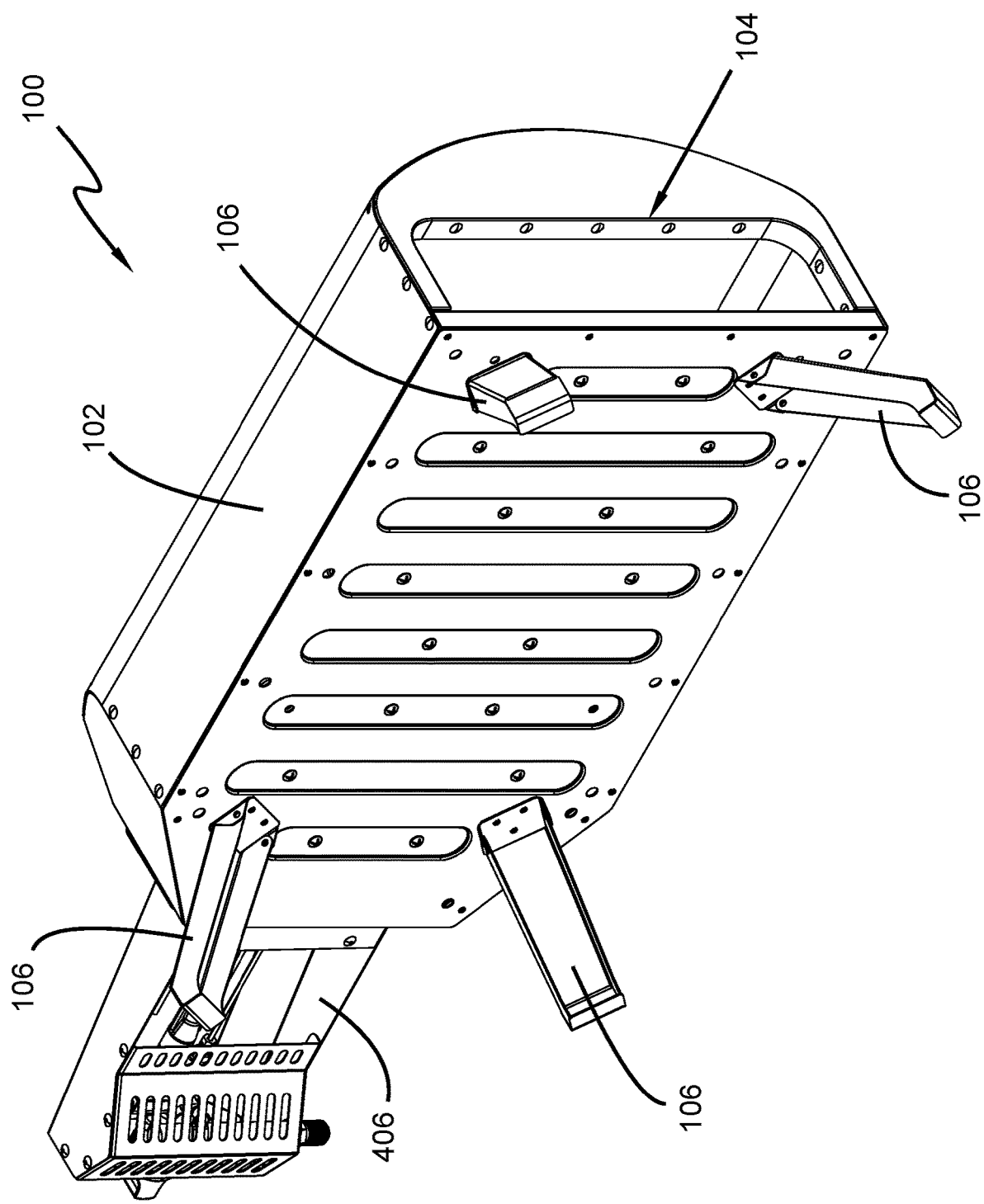
FIG. 2 shows additional aspects of the oven of FIG. 1.
Figure 3:
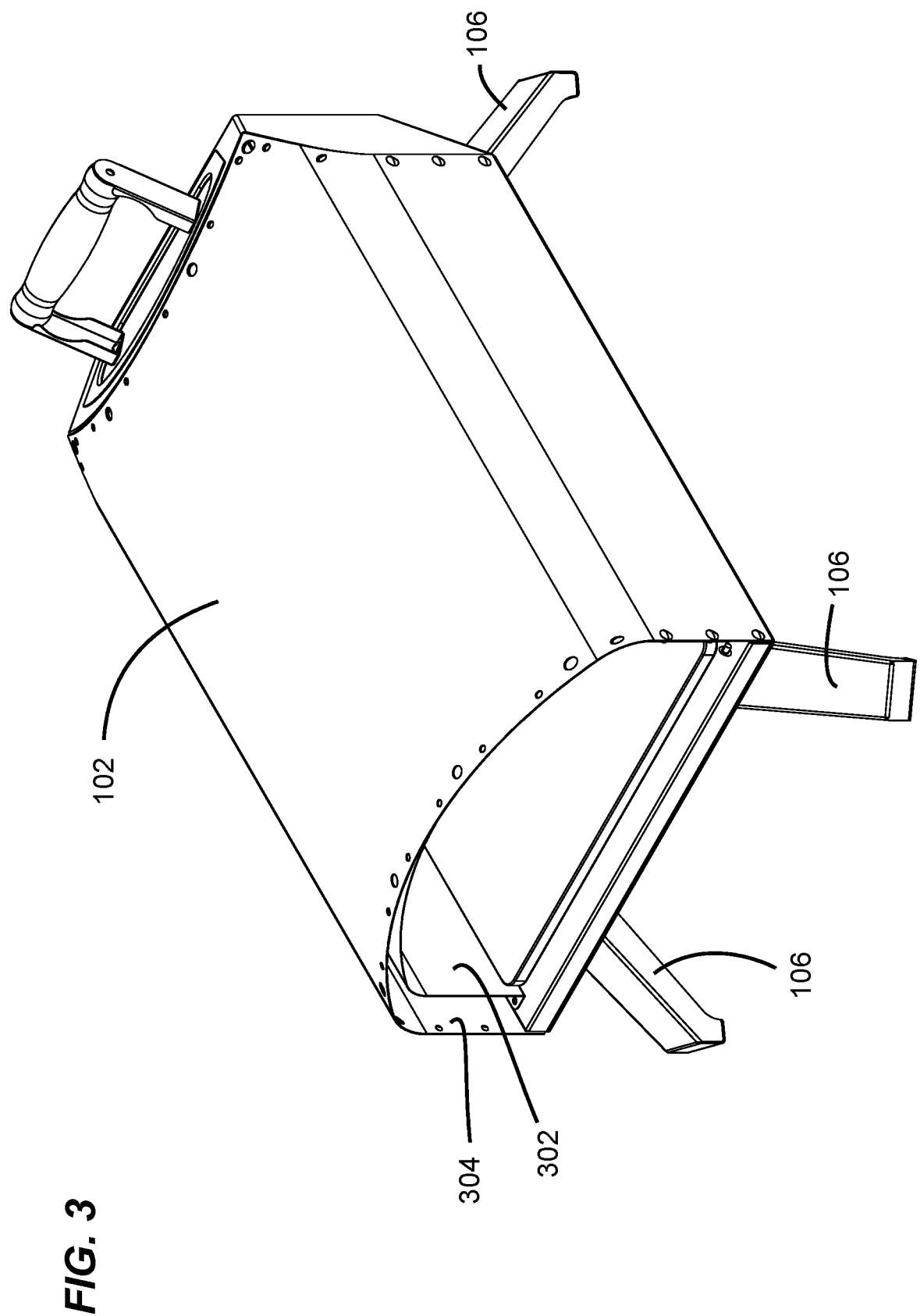
FIG. 3 shows additional aspects of the oven of FIG. 1.
Figure 4:
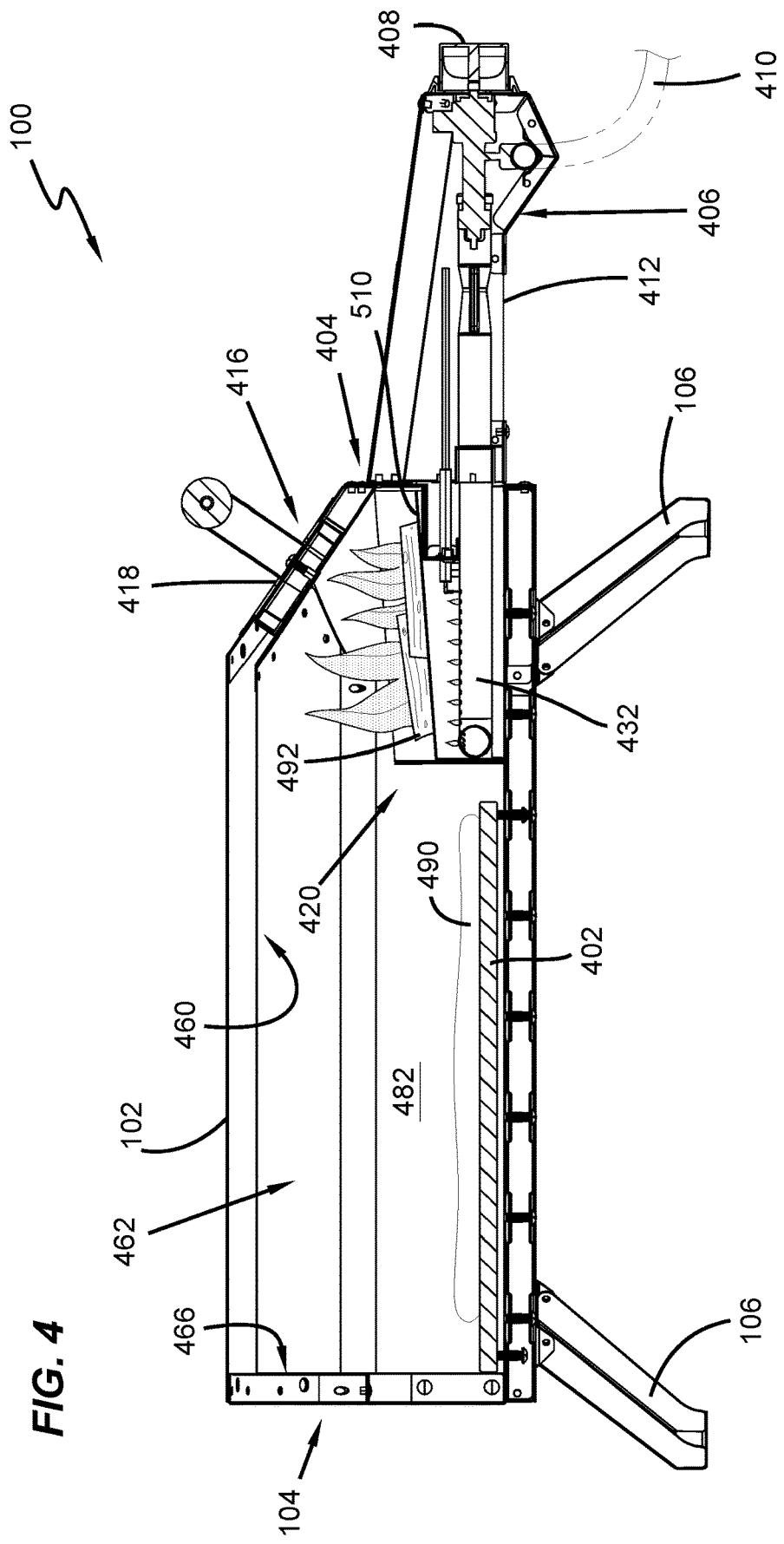
FIG. 4 shows a cross-sectional view of the oven of FIG. 1.

Referring now to FIGS. 1-4, an example oven 100 is shown. The oven 100 includes a generally rectangular body 102 formed of an inner shell 302 and an outer shell 304. The body 102 forms a cooking cavity 482 therein. In this example, a layer of insulation can be positioned between the inner shell 302 and the outer shell 304 to help maintain a more consistent temperature for the cooking cavity 482.

Figure 5:
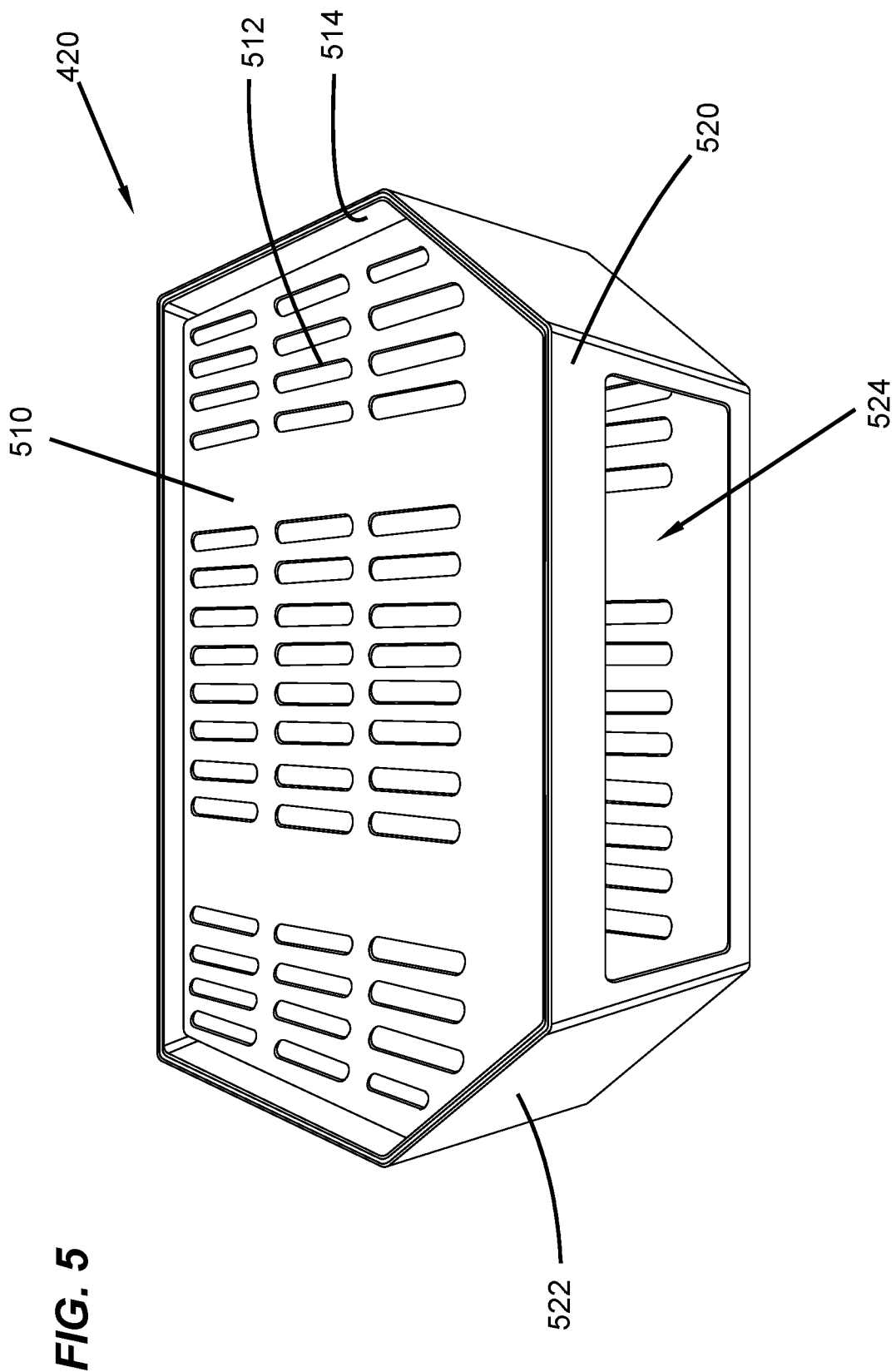
FIG. 5 shows an example wood burning tray assembly of the oven of FIG. 1.
Figure 6:
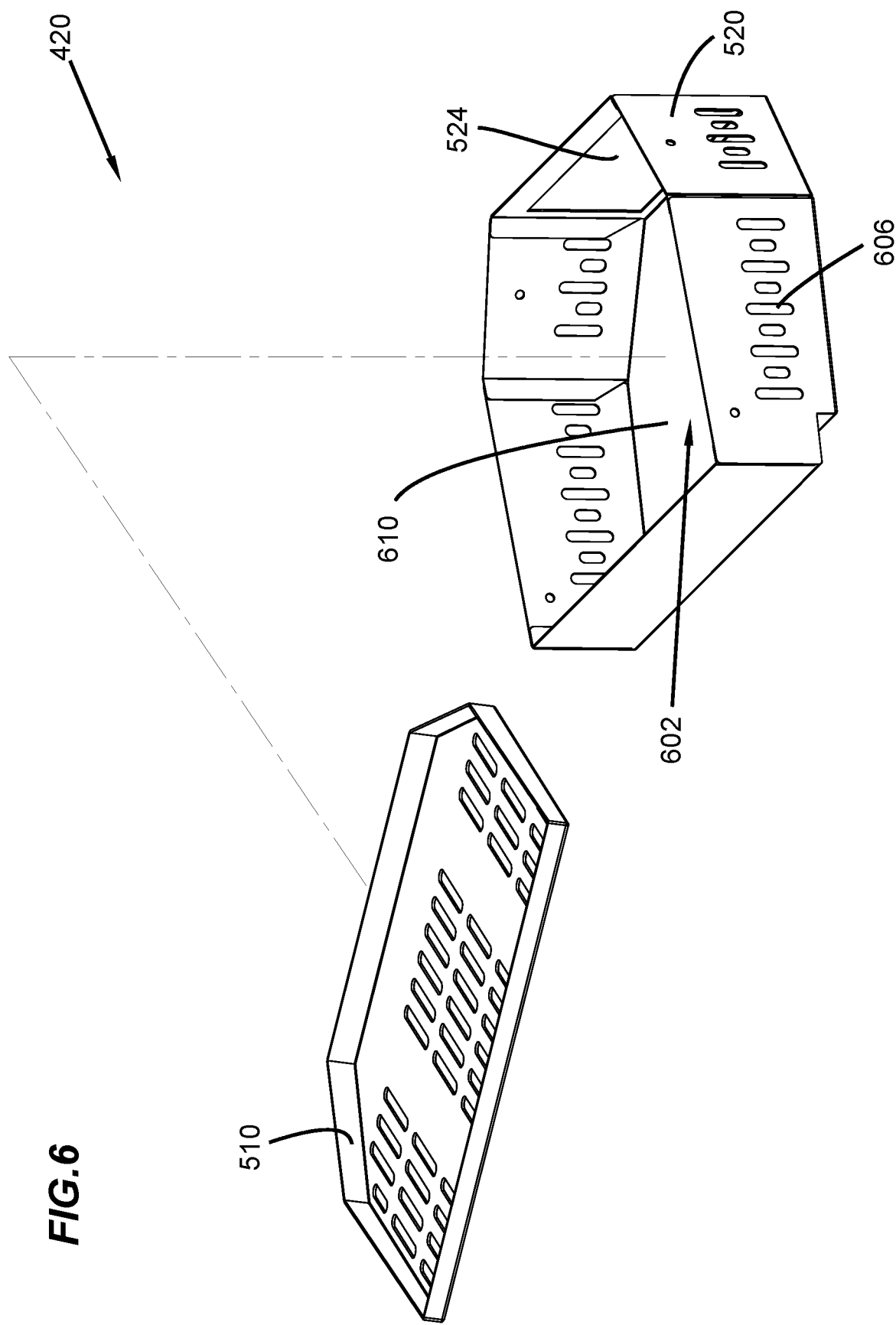
FIG. 6 shows additional aspects of the wood burning tray assembly of FIG. 5.
Figure 7:
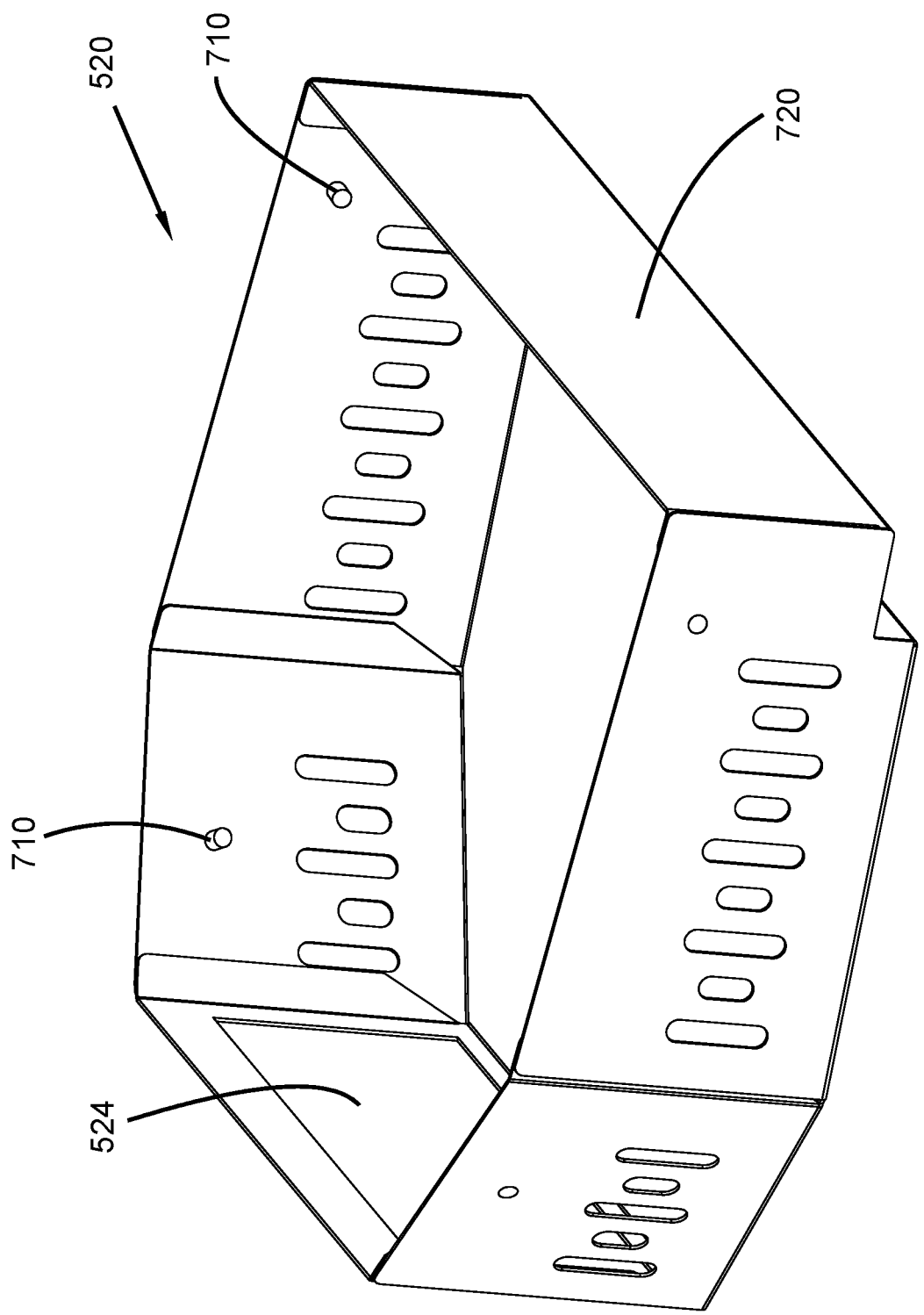
FIG. 7 shows additional aspects of the wood burning tray assembly of FIG. 5.
Figure 8:
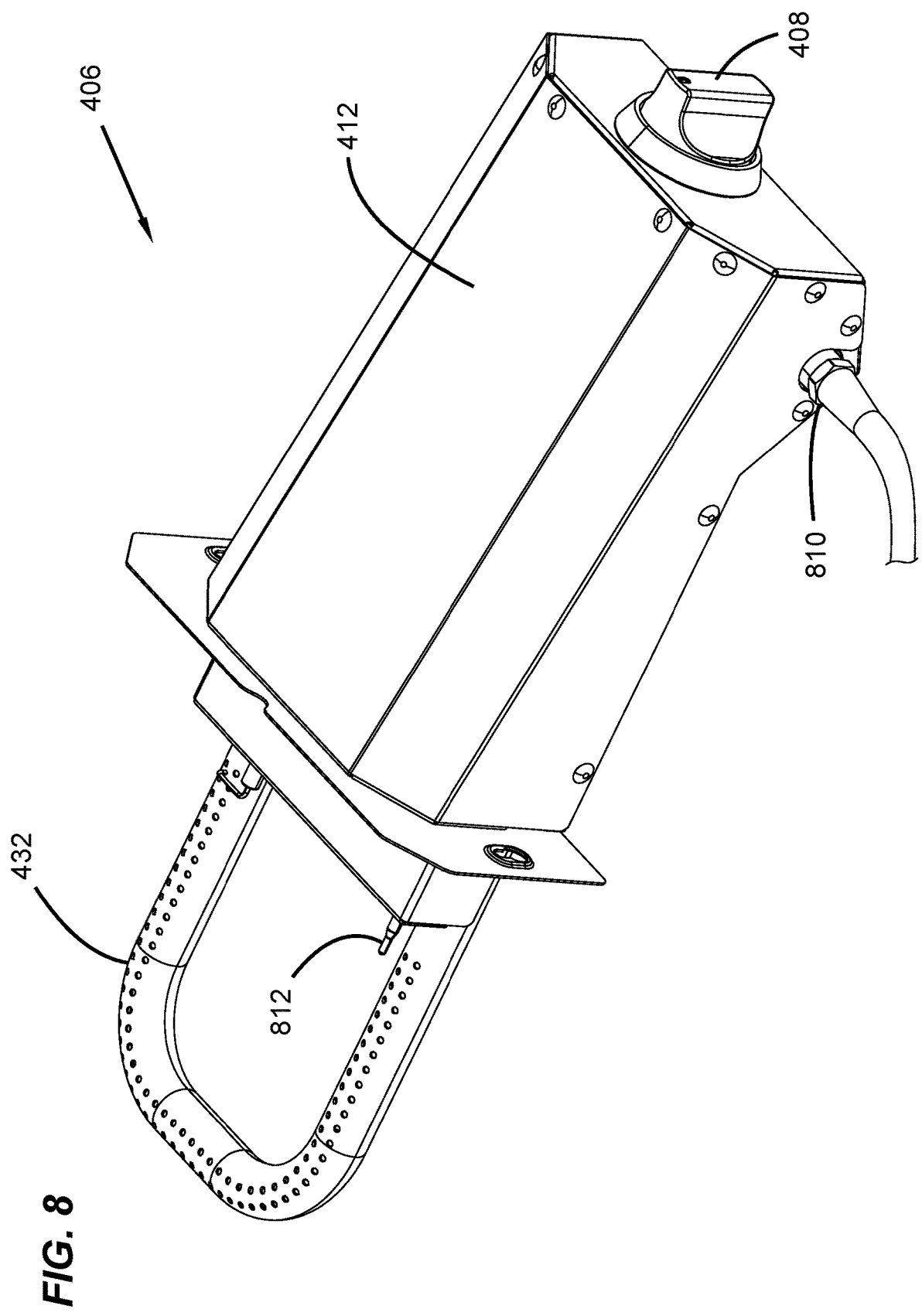
FIG. 8 shows an example gas burner of the oven of FIG. 1.
Figure 9:
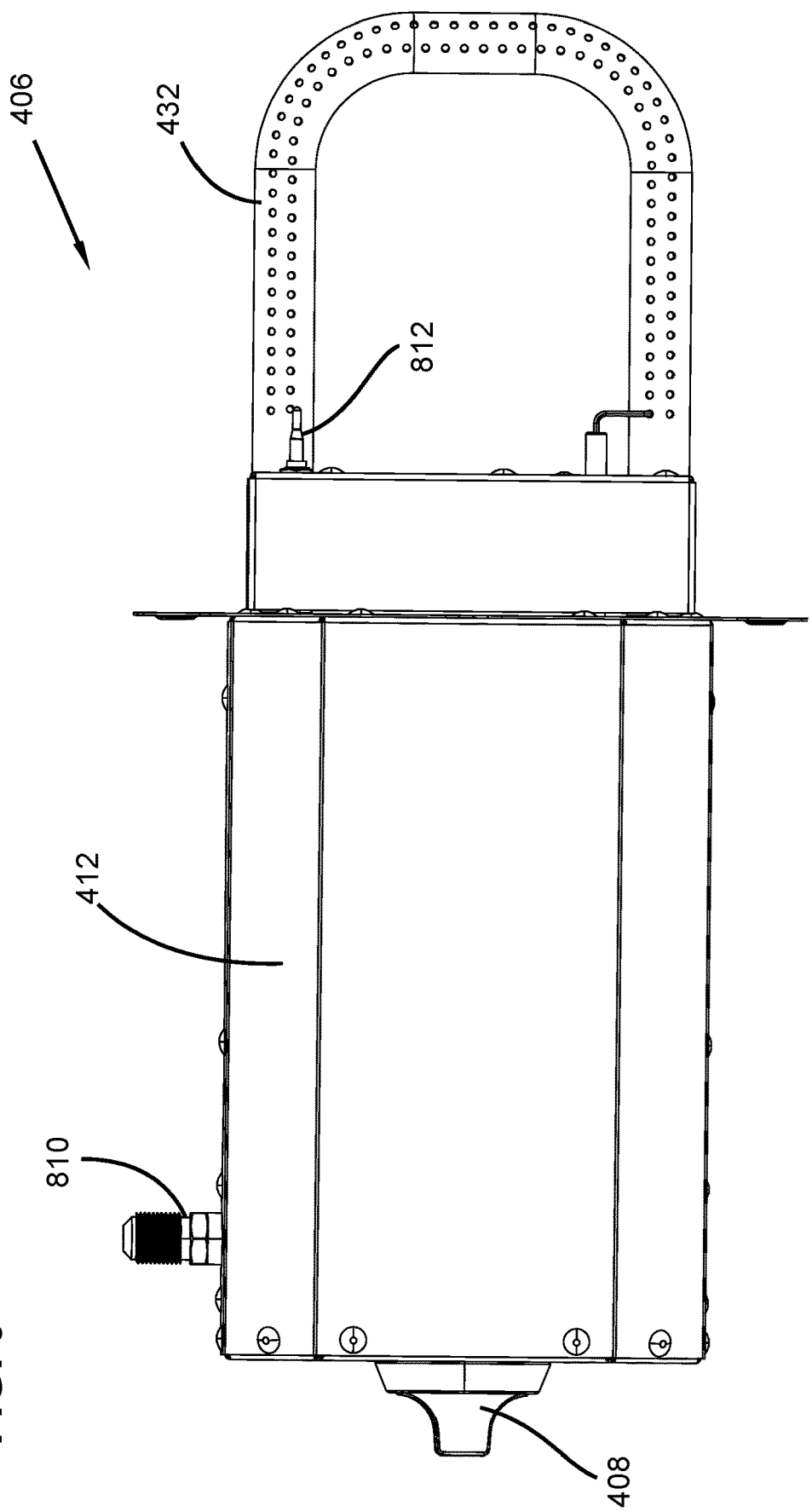
FIG. 9 shows additional aspects of the gas burner of FIG. 8.
Figure 10:
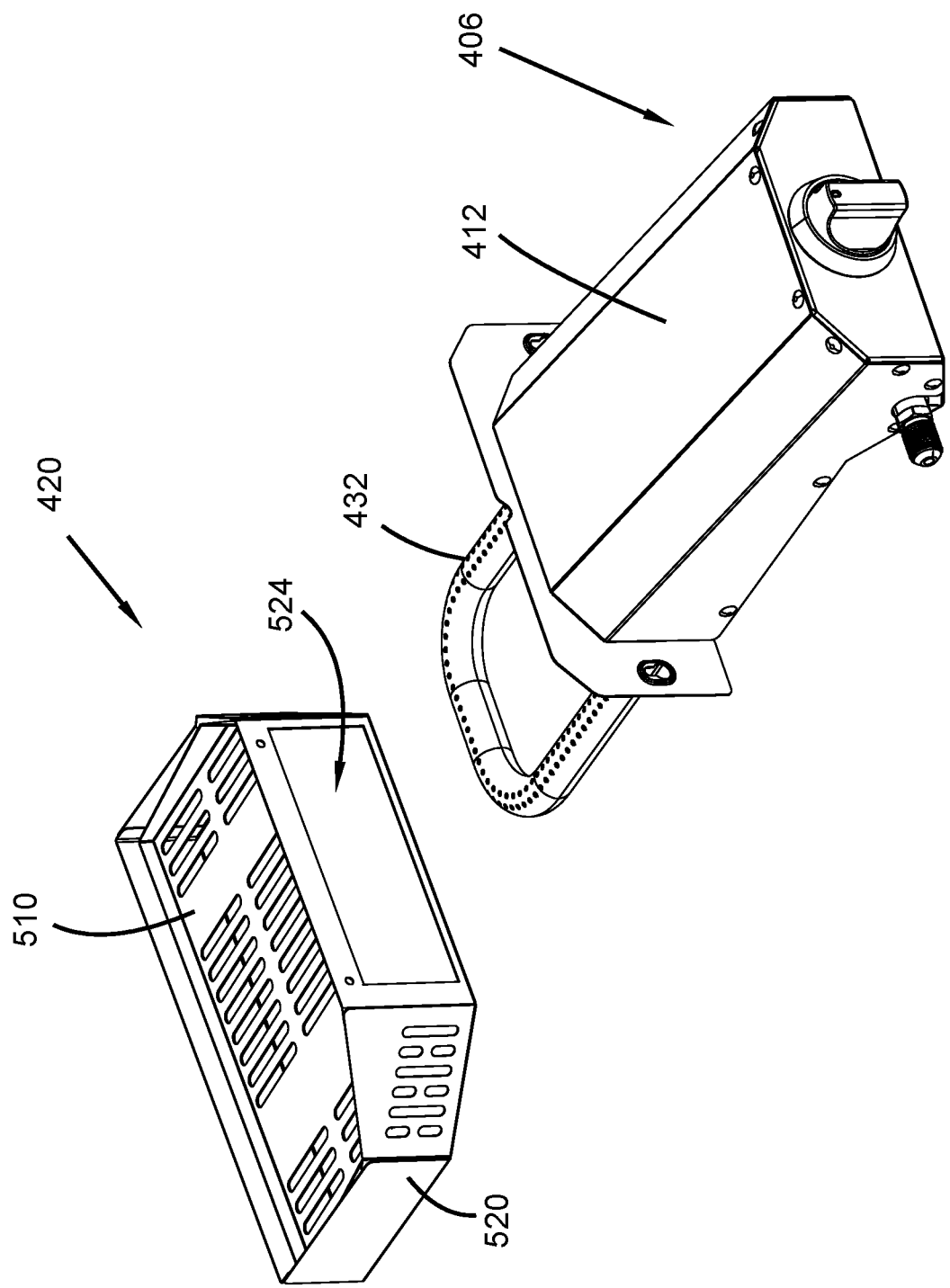
FIG. 10 shows the wood burning tray assembly and the gas burner of the oven of FIG. 1 in isolation in an uncoupled state.
Figure 11:
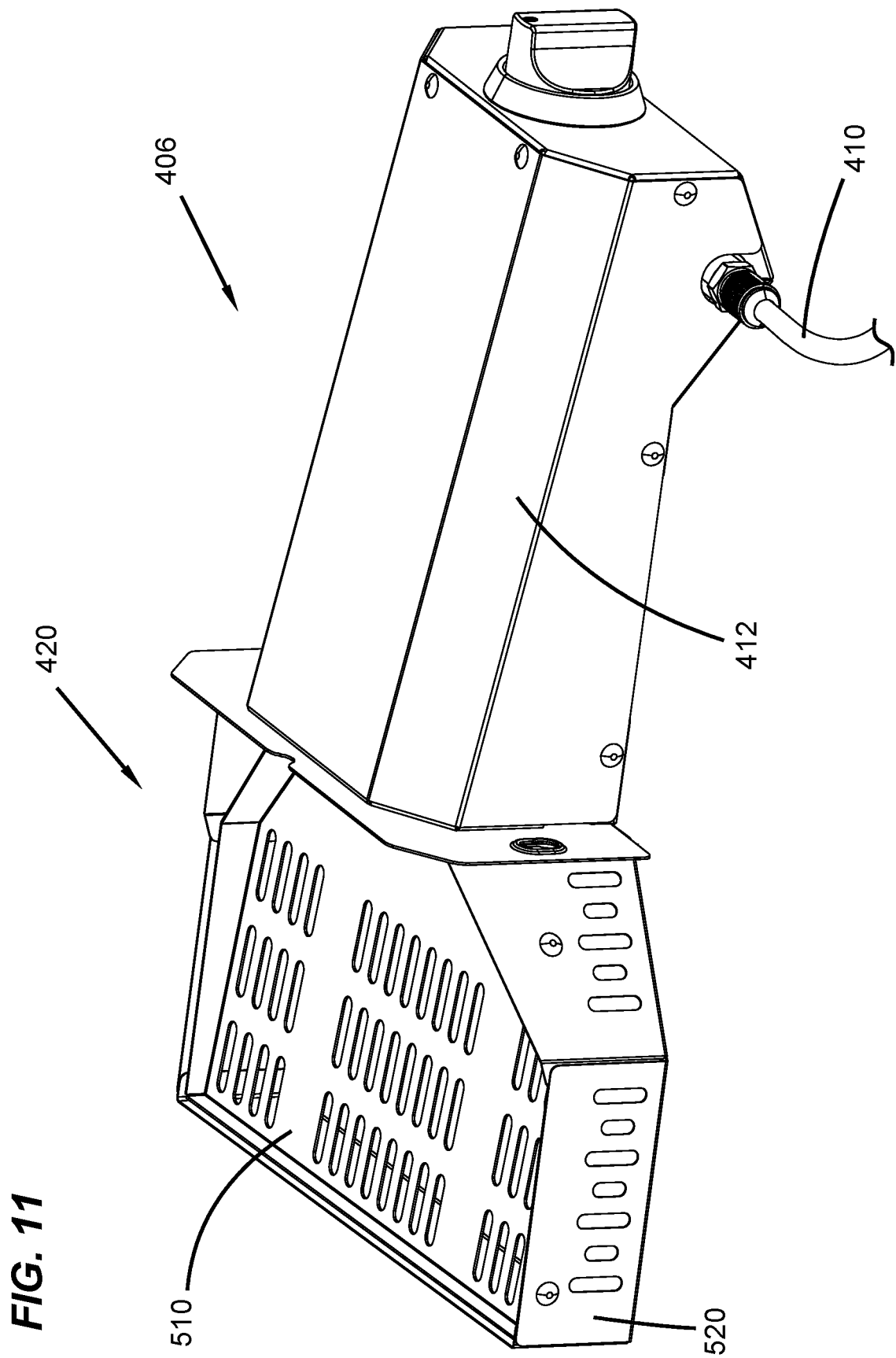
FIG. 11 shows the wood burning tray assembly and the gas burner of the oven of FIG. 1 in isolation in a coupled state.
Figure 12:
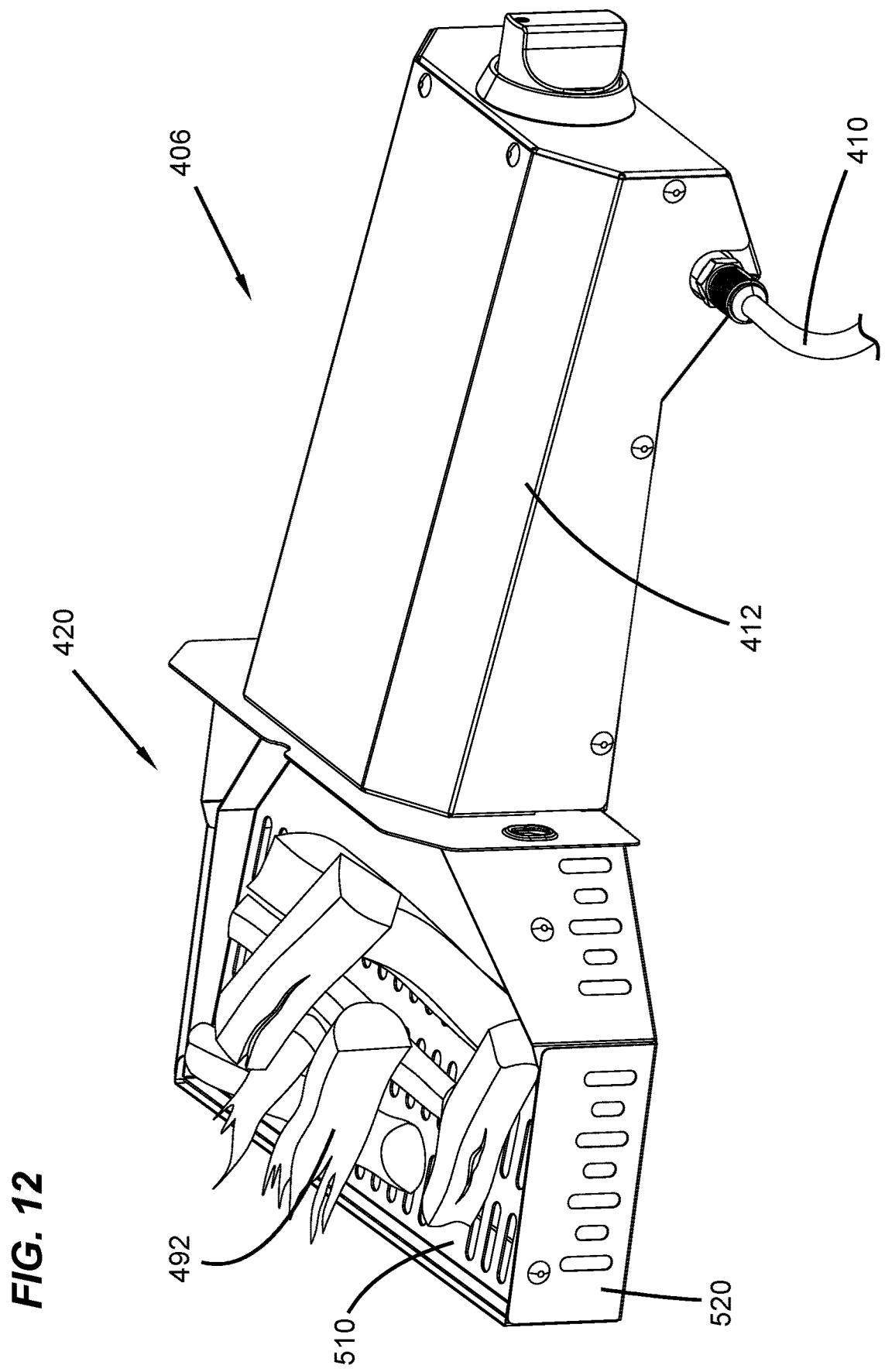
FIG. 12 shows the wood burning tray assembly and the gas burner of the oven of FIG. 11 with wood.
Figure 13:
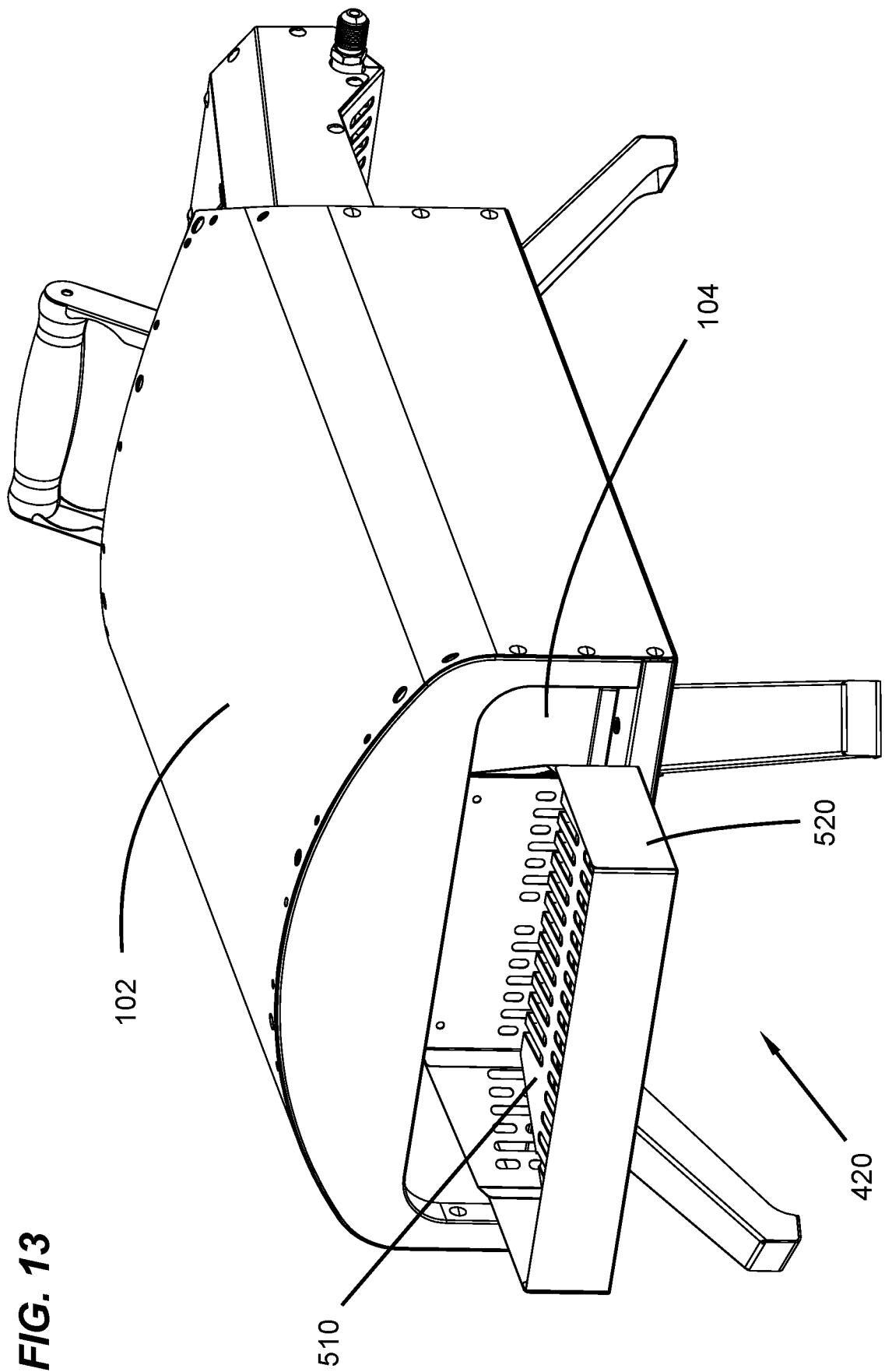
FIG. 13 shows the wood burning tray assembly being inserted into the oven of FIG. 1.
Figure 14:
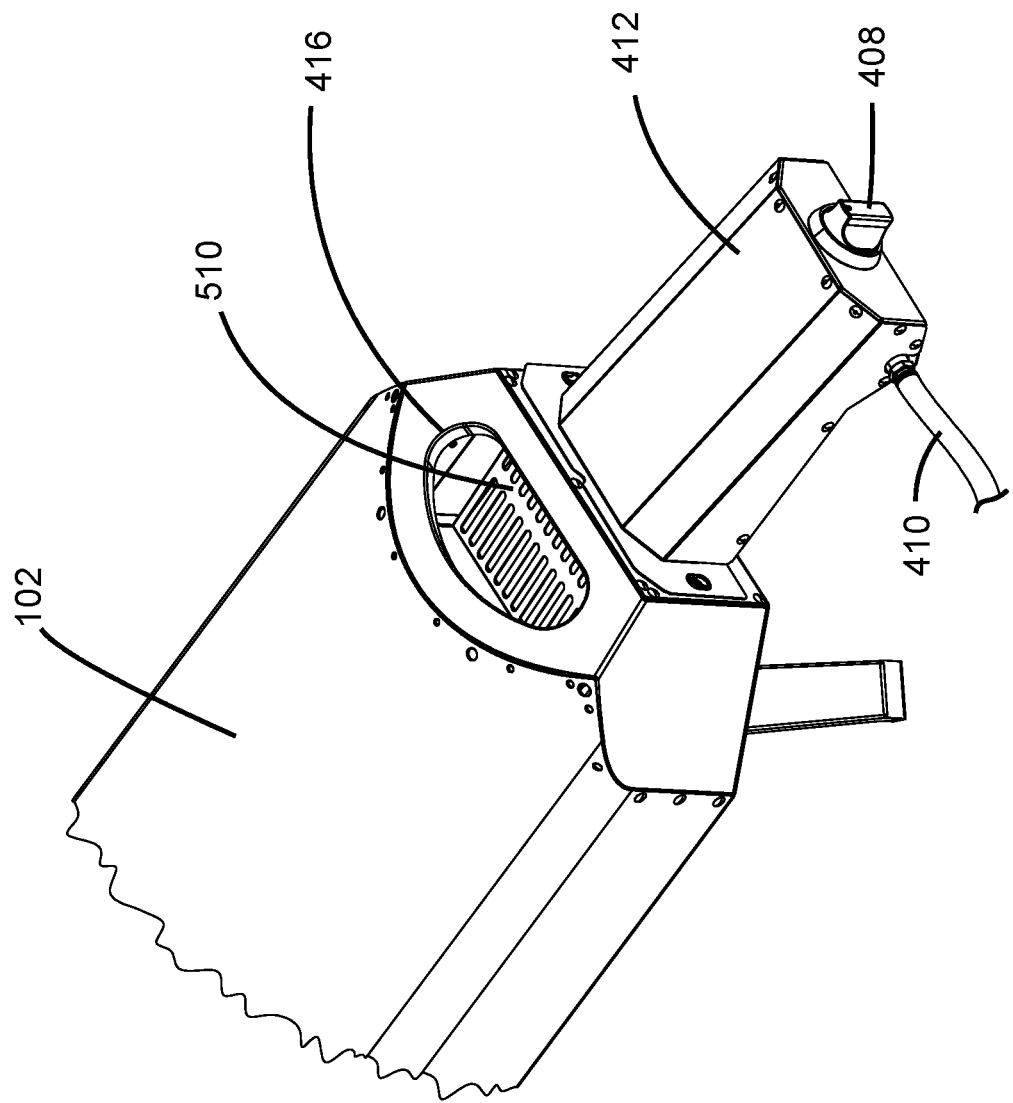
FIG. 14 shows additional aspects of the oven of FIG. 1.
Figure 15:
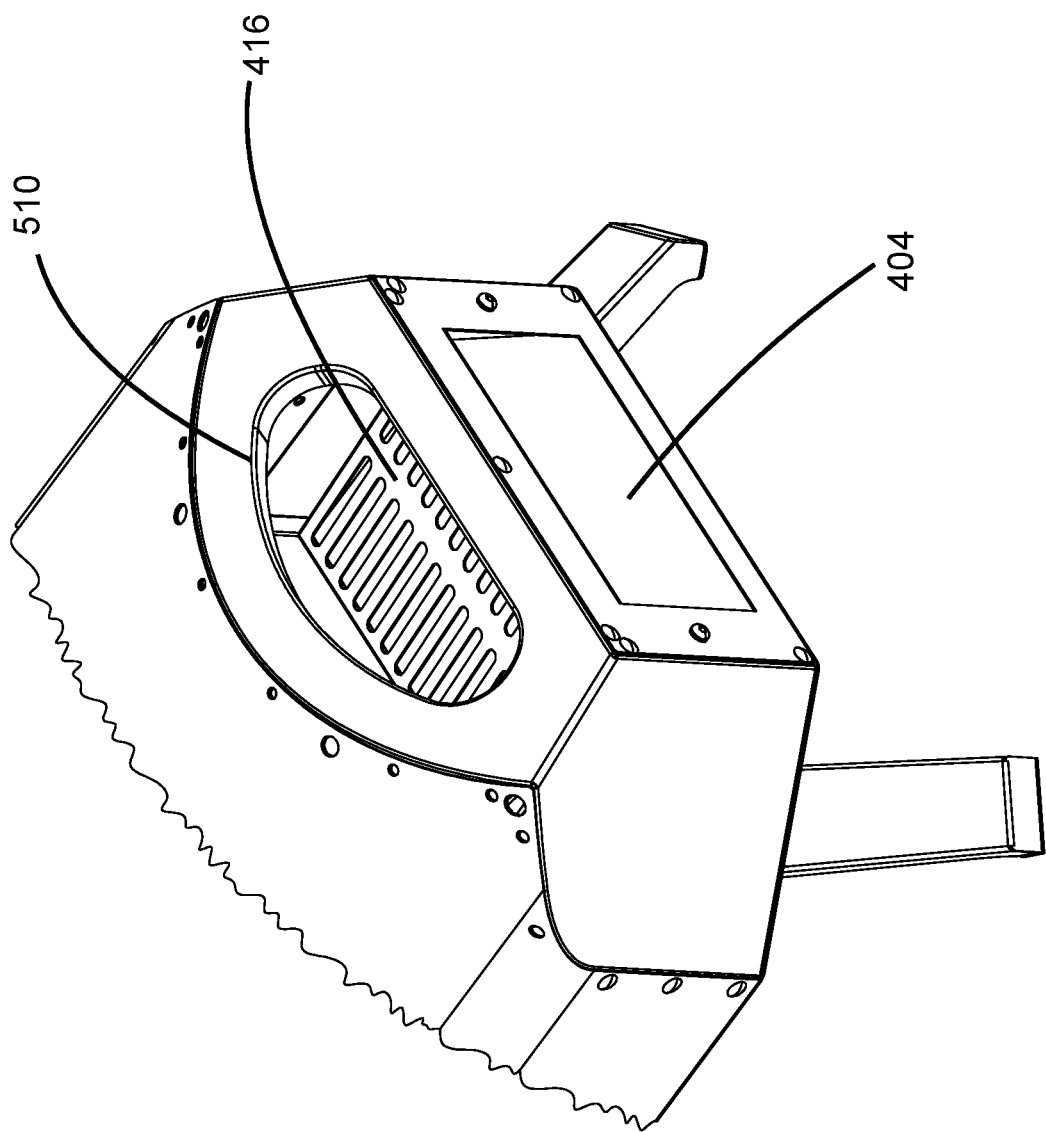
FIG. 15 shows additional aspects of the oven of FIG. 1.
Figure 16:
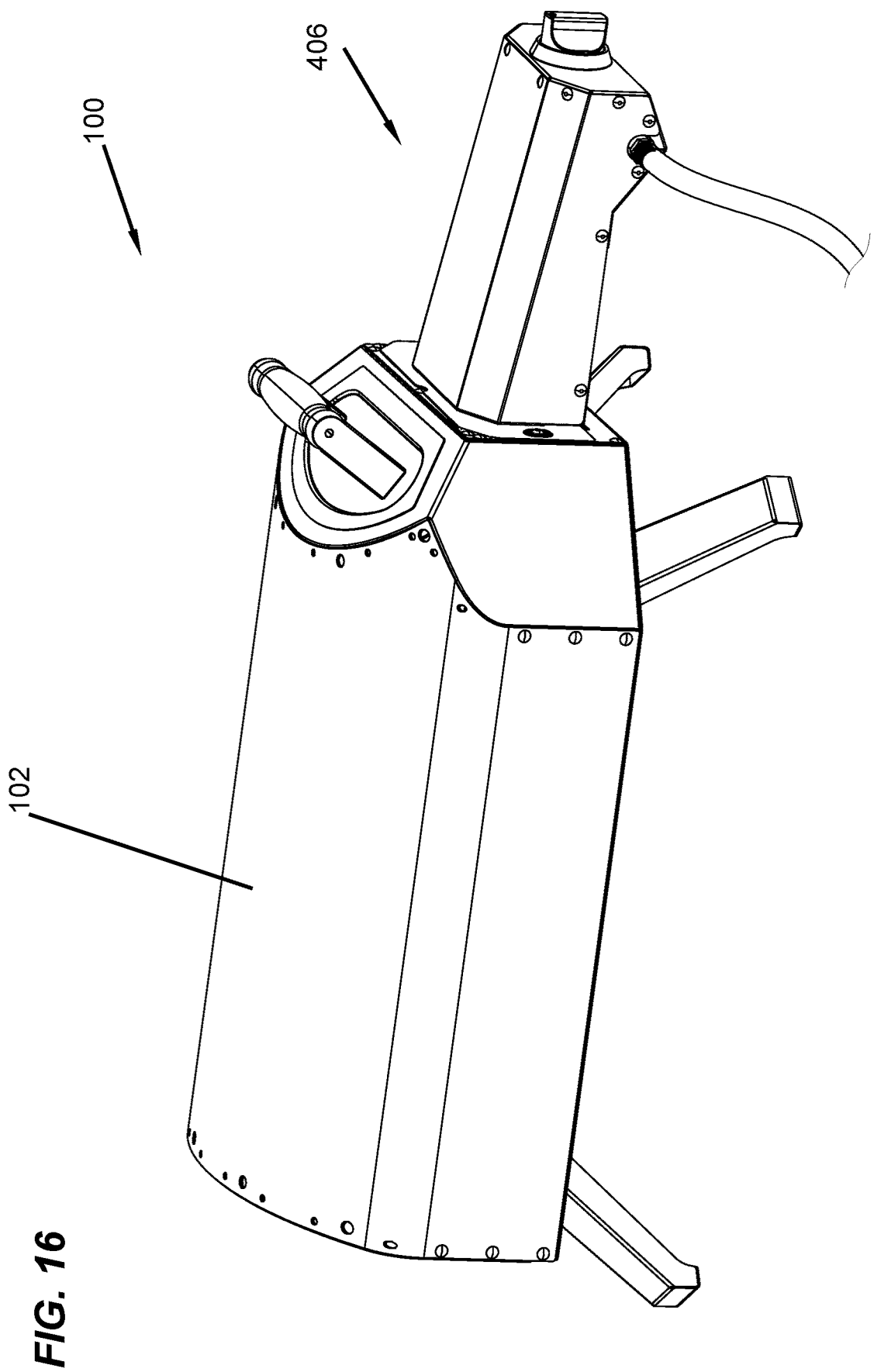
FIG. 16 shows additional aspects of the oven of FIG. 1.
Figure 17:
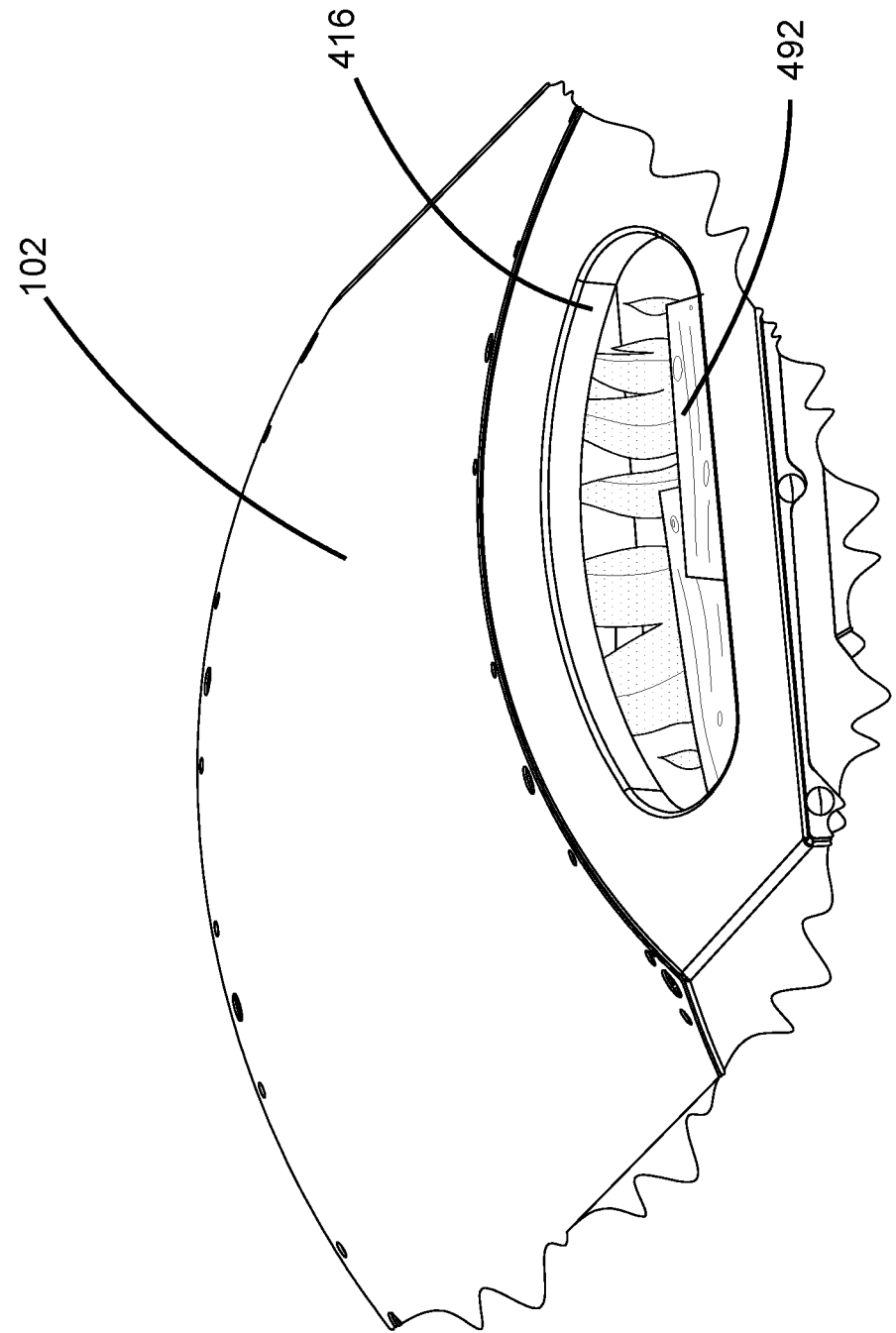
FIG. 17 shows additional aspects of the oven of FIG. 1.
Figure 18:
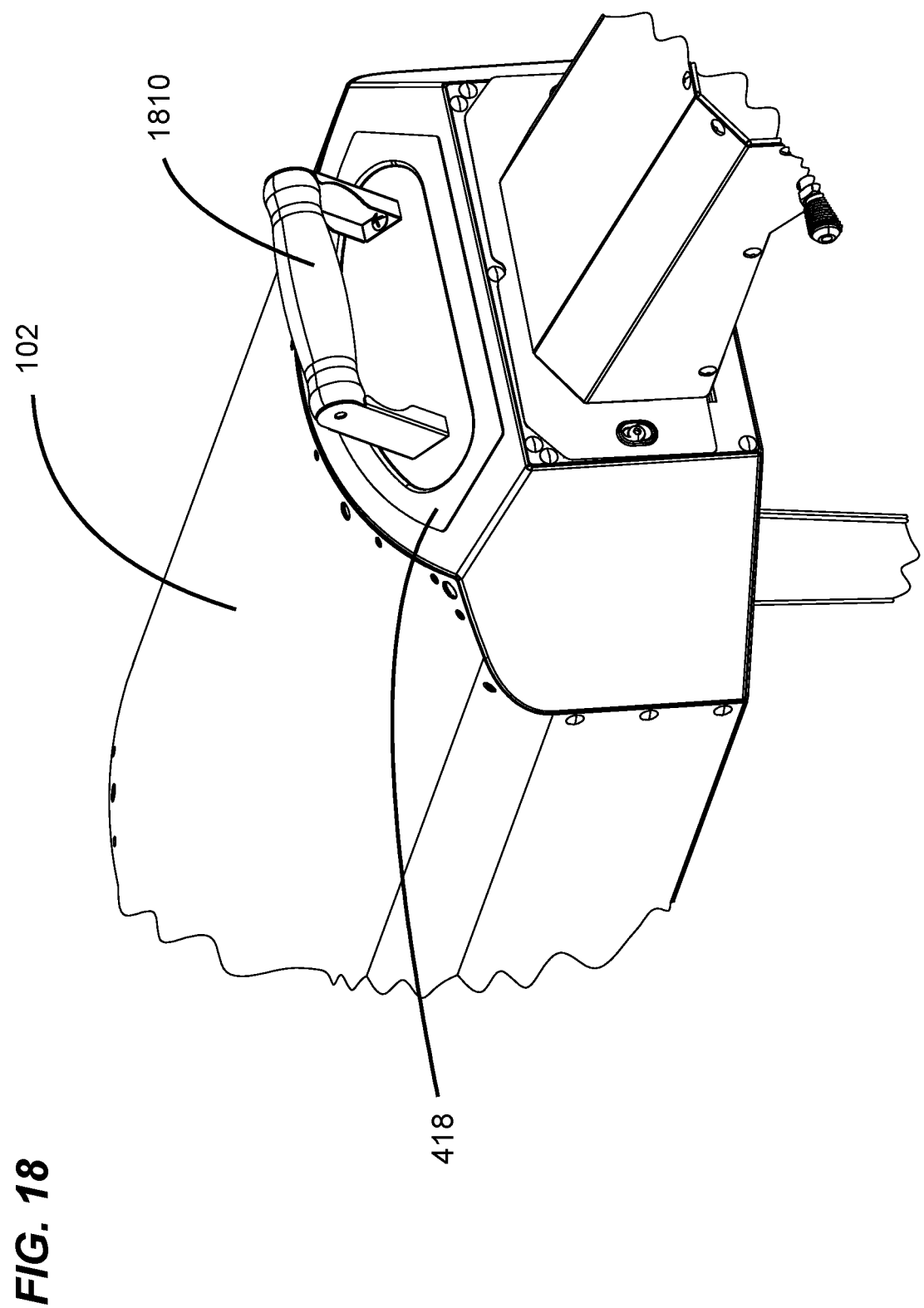
FIG. 18 shows additional aspects of the oven of FIG. 1.

Referring now to FIGS. 4-17, in the example depicted, the oven 100 is fueled by both a gas burner 406 and wood held by a wood burning tray assembly 420. Specifically, heat from the gas burner 406 heats the oven 100 and ignites wood 492 on the wood burning tray assembly 420.

In this example, a Neapolitan style pizza 490 (or other food item) is positioned on a removable baking stone 402 (e.g., made of cordierite) within the oven 100. The heat generated by the gas burner 406 and the burning wood 492 held by the wood burning tray assembly 420 increases the cooking cavity 482 to a desired temperature (e.g., 900+ degrees Fahrenheit) to cook the Neapolitan style pizza 490 in a short amount of time (e.g., 90 seconds).

More specifically, the oven 100 is heated from the back by the gas burner 406 and the burning wood 492 positioned on the wood burning tray assembly 420. The heat and smoke rises to a ceiling 460 of the oven 100, then moves towards a front cooking area 462 of the cooking cavity 482, where the Neapolitan style pizza 490 is positioned.

In this example, there is no door on the front of the body 102 to close a front opening 104. This front opening 104 acts as the exhaust for the heat and smoke from burning fuel sources. This front opening 104 draws the heat from the back of the oven to the front cooking area 462.

A front ledge 466 is formed below the ceiling 460 of the oven 100 that causes some of the heat from the gas burner 406 and burning wood 492 held by the wood burning tray assembly 420 to reflect downwards and convection/circulate through the oven 100. This heats up the removable baking stone 402 to allow the bottom of the Neapolitan style pizza 490 to cook evenly with the top part of the Neapolitan style pizza 490. Further, smoke from the burning wood 492 is directed along a similar path add the desired smoky flavor to the Neapolitan style pizza 490.

The wood burning tray assembly 420 includes a top grate 510 and an ashtray 520. As noted, the wood burning tray assembly 420 generally holds burning wood 492 positioned within the cooking cavity 482 of the oven 100.

The top grate 510 generally supports wood 492 positioned on the top grate 510 and includes openings 512 to allow air to circulate around for combustion and ash to fall into the ashtray 520. The top grate 510 also includes a lip 514 to generally maintain the wood on the top grate 510.

The ashtray 520 of the wood burning tray assembly 420 includes sides 522 with openings 606 to allow for airflow therethrough for combustion. Pegs 710 are positioned about the sides 522 to engage and hold the top grate 510 in position on top of the ashtray 520, as shown.

The ashtray 520 also includes an opening 524 through which a portion of the gas burner 406 is positioned, as described further herein. The sides 522 and a bottom 610 of the ashtray 520 form an interior space 602 where combustion of the gas by the gas burner 406 occurs. In addition, ash from the burning wood 492 on the top grate 510 falls (e.g., through the openings 512) and is maintained in the ashtray 520 for easier disposal later.

A flame guard 720 is formed as one of the sides 522 of the ashtray 520 facing the cooking area 462. The flame guard 720 is solid and forms a barrier between the hot gas burner 406 and the Neapolitan style pizza 490 so that a crust of the Neapolitan style pizza 490 closest to the gas burner 406 does not burn.

The gas burner 406 is generally positioned through an opening 404 at the back of the oven 100. The gas burner 406 includes a main body 412 that controls the gas burner 406. The main body 412 is connected by a hose barb 810 and through a hose 410 to a source of gas, such a propane. A control knob 408 can be rotated to turn on and off the flow of gas to a gas burner tube 432 coupled to the main body 412 of the gas burner 406.

The burner tube 432 is perforated with holes through which the gas (e.g., propane) flows for combustion. In position within the opening 404 of the oven 100, the burner tube 432 extends through the opening 524 of the wood burning tray assembly 420 and into the interior space 620 where combustion occurs to heat the oven 100 and ignite/burn the wood 492 on the grate 510 of the wood burning tray assembly 420.

The oven 100 is generally assembled as follows. The oven 100 is placed outside (or in a structure with proper ventilation) on a level surface. With the baking stone 402 removed, the wood burning tray assembly 420 is inserted through the front opening 104 of the oven 100 and pushed to the back.

The gas burner 406 is then inserted through the opening 404 at the back of the oven 100 so that the burner tube 432 extends through the opening 524 of the wood burning tray assembly 420 and into the interior space 620. The main body 412 of the gas burner 406 can be affixed to the oven 100 in this position using one or more fasteners (e.g., bolts).

The hose 410 is then attached to a source of gas, such as a propane tank. The control knob 408 can be actuated (e.g., pushed in and rotated) to turn on the flow of gas to the burner tube 432 coupled to the main body 412 of the gas burner 406. An automatic igniter 812 can be actuated by holding in the control knob 408 for a specified period (e.g., 5 seconds). Gas flowing through the burner tube 432 is thereby ignited.

The flame from the gas burner 406 will heat up the cooking cavity 482 of the oven 100 to the desired temperature. A short time (e.g., about 5 minutes) before the Neapolitan style pizza 490 is introduced, small pieces of dry wood 492 are added to the top grate 510 through an access hatch 416 in the back of the oven 100. The flame from the gas burner 406, which is positioned adjacent to (e.g., below) the top grate 510 ignites the wood 492. The hatch door 418 can be placed to close the access hatch 416 to allow the heat and smoke to be circulated to the front of the oven 100 as described herein. The user can periodically remove the hatch door 418 using a handle 1810 to add more wood 492, as needed.

The Neapolitan style pizza 490 can thereupon be positioned on the baking stone 402 within the cooking cavity 482 to rapidly cook the pizza in as little as 90 seconds.

As the wood 492 burns, the ash from the wood 492 falls onto the bottom 610 of the ashtray 520 within the interior space 602. The ash can easily be removed once the oven 100 cools by disconnecting the gas burner 406 and sliding the wood burning tray assembly 420 out of the front opening 104.

The majority of the components of the oven can be made from stainless or similar materials that are assembled to form the oven, including the gas burner and the wood burning tray assembly. The size and/or shape of each component can be modified from that depicted and still function in a similar way.

What is claimed is:

1. An oven, comprising:
a main body defining a cooking cavity;
a front portion of the main body defining a front opening for receiving a pizza and acting as an air vent;
a wood burning tray assembly including a grate positioned in the main body; and
a gas burner positioned adjacent to the wood burning tray assembly;
a baking stone positioned within the cooking cavity;
a hatch opening defined in a back portion of the main body opposite to that of the front opening, the hatch opening being sized to allow for access to the grate positioned in the cooking cavity, and the hatch opening being oriented at an angled relative to a top portion of the oven;
wherein the gas burner is configured to combust a gas to heat the cooking cavity; and
wherein the gas burner is positioned to ignite wood on the grate of the wood burning tray assembly to further heat the cooking cavity.

2. The oven of claim 1, wherein the wood burning tray assembly further comprises an ashtray defining an opening through which a gas burner tube of the gas burner extends.

3. The oven of claim 2, wherein the grate is positioned on the ashtray of the wood burning tray assembly.

4. The oven of claim 3, wherein the grate defines a plurality of openings that allow air to reach the wood positioned thereon and ash from the wood to fall into the ashtray once the wood is combusted.

5. The oven of claim 1, wherein smoke from the wood circulates to reach the pizza.

6. The oven of claim 1, further comprising a hatch door sized to cover the hatch opening.

7. The oven of claim 1, wherein the cooking cavity is configured to allow heat from the gas burner and the wood to circulate within the cooking cavity and exhaust out the front opening.

8. An oven, comprising:
a main body defining a cooking cavity;
a front portion of the main body defining a front opening for receiving a pizza and acting as an air vent;
a rear portion opposite to the front portion of the main body, the rear portion defining a rear opening;
a gas burner including a gas burner tube extending through the rear opening in the rear portion; and
a wood burning tray assembly positioned in the main body, the wood burning tray assembly including:
  a grate; and
  an ashtray defining an opening through which the gas burner tube of the gas burner extends;
a baking stone positioned within the cooking cavity to support the pizza;
a hatch opening defined in the main body at the rear portion to allow for access to the grate positioned in the cooking cavity to allow for wood to be placed directly on the grate, the hatch opening being oriented at an angled relative to a top portion of the oven; and
a hatch door sized to cover the hatch opening, the hatch door including a handle to allow the hatch door to be removed from the hatch opening to access the grate;
wherein the gas burner is configured to combust a gas to heat the cooking cavity;
wherein the gas burner tube is positioned to ignite the wood on the grate of the wood burning tray assembly to further heat the cooking cavity; and
wherein the baking stone is heated by both the gas burner and the wood on the grate.

9. The oven of claim 8, wherein the grate is positioned on the ashtray of the wood burning tray assembly.

10. The oven of claim 8, wherein the grate defines a plurality of openings that allow air to reach the wood positioned thereon and ash from the wood to fall into the ashtray once the wood is combusted.

11. The oven of claim 8, wherein smoke from the wood circulates to reach the pizza.

12. The oven of claim 8, wherein the cooking cavity is configured to allow heat from the gas burner and smoke from the wood to circulate within the cooking cavity and exhaust out the front opening.

\* \* \* \* \*